(12) United States Patent
Denner et al.

(10) Patent No.: US 10,758,874 B2
(45) Date of Patent: Sep. 1, 2020

(54) METHOD AND DEVICE FOR GENERATING A CONTINUOUS CARRIER GAS/VAPOUR MIXTURE STREAM

(71) Applicant: Netzsch-Gerätebau GmbH, Selb (DE)

(72) Inventors: Thomas Denner, Selb (DE); Georg Storch, Selb (DE); Alexander Zuber, Mehlmeisel (DE); Christoph Schmidt, Hof (DE); Jan Hanss, Selb (DE); Thilo Hilpert, Selb (DE)

(73) Assignee: Netzsch-Gerätebau GmbH, Selb (DE)

( * ) Notice: Subject to any disclaimer, the term of this patent is extended or adjusted under 35 U.S.C. 154(b) by 207 days.

(21) Appl. No.: 15/699,193

(22) Filed: Sep. 8, 2017

(65) Prior Publication Data

US 2018/0071694 A1 Mar. 15, 2018

(30) Foreign Application Priority Data

Sep. 15, 2016 (DE) .......................... 10 2016 117 333
Feb. 8, 2017 (DE) .......................... 10 2017 102 446

(51) Int. Cl.

| | |
|---|---|
| *F16K 11/20* | (2006.01) |
| *B01F 3/02* | (2006.01) |
| *B01B 1/00* | (2006.01) |
| *B01D 1/00* | (2006.01) |
| *B01D 3/34* | (2006.01) |
| *B01F 15/00* | (2006.01) |

(52) U.S. Cl.
CPC ................ *B01F 3/022* (2013.01); *B01B 1/00* (2013.01); *B01D 1/0082* (2013.01); *B01D 3/346* (2013.01); *B01F 3/028* (2013.01); *B01F 15/00344* (2013.01); *B01F 2215/0037* (2013.01)

(58) Field of Classification Search
CPC .......... B01F 3/022; B01F 3/026; B01F 3/028; B01F 3/04014; B01F 3/04007; B01F 2003/0078
See application file for complete search history.

(56) References Cited

U.S. PATENT DOCUMENTS

| | | | | |
|---|---|---|---|---|
| 3,528,418 | A | * 9/1970 | Lowe ...................... | B01F 3/022 128/200.13 |
| 4,915,123 | A | * 4/1990 | Morgovsky ............. | B01F 3/026 137/599.04 |
| 5,049,317 | A | * 9/1991 | Kiske .................. | A61M 16/104 128/203.14 |

(Continued)

FOREIGN PATENT DOCUMENTS

| | | |
|---|---|---|
| JP | 2008309550 A | 12/2008 |
| JP | 2009534528 A | 9/2009 |
| WO | 2018136628 A1 | 7/2018 |

*Primary Examiner* — Reinaldo Sanchez-Medina
(74) *Attorney, Agent, or Firm* — Whitmyer IP Group LLC

(57) ABSTRACT

A method for generating a continuous carrier gas/vapour mixture stream containing a carrier gas, and a vapour of a liquid. The method includes provision of a first metered carrier gas stream, provision of a second metered carrier gas stream, provision of a metered, vapour-saturated carrier gas/vapour mixture stream, mixing of the second stream and the metered stream to provide a first gaseous mixture stream; and provision of a metered liquid stream fed to an evaporation/mixing device for evaporating the liquid and mixing with the first gaseous mixture stream to provide a second gaseous mixture stream.

5 Claims, 3 Drawing Sheets

(56) References Cited

U.S. PATENT DOCUMENTS

| | | | | |
|---|---|---|---|---|
| 5,495,875 A | * | 3/1996 | Benning | F17C 5/005 137/3 |
| 2006/0263283 A1 | * | 11/2006 | Egan | B01F 3/026 423/210 |
| 2015/0078115 A1 | * | 3/2015 | Pongraz | B01F 5/0456 366/152.1 |
| 2018/0133665 A1 | * | 5/2018 | Brammer | B01F 5/0403 |

\* cited by examiner

METHOD AND DEVICE FOR GENERATING A CONTINUOUS CARRIER GAS/VAPOUR MIXTURE STREAM

TECHNICAL FIELD

The present invention relates to a method and a device for generating a continuous carrier gas/vapour mixture stream containing adjustable proportions on the one hand of carrier gas and on the other hand of a vapour of a liquid.

BACKGROUND

Such methods and devices are known from the prior art and can be used in particular in the context of investigating material properties under predetermined and, as the case may be, variably predetermined ambient conditions. Examples of this are the investigation of the sorption capacity, the (e.g. thermal) length expansion, the rigidity, the crystallographic structure etc. of a material sample, which is arranged in a sample chamber through which the carrier gas/vapour mixture stream flows.

The carrier gas can in particular be an inert gas (e.g. nitrogen, helium, argon etc., or mixtures of noble gases). The vaporous component or the liquid whose vapour is contained in the carrier gas/vapour mixture stream is usually water, but mixtures with vapours of organic components such as for example alcohols are known.

The following methods for the generation of carrier gas/vapour mixtures with the aim of generating a predetermined vapour concentration (equivalent to predetermined proportions of the carrier gas and the vapour) are established in the prior art:

evaporation of the liquid and making the carrier gas available, and subsequent metering/mixing of the two components in the gaseous state.

Evaporation of a previously metered liquid stream and addition of a metered carrier gas stream (so-called "direct evaporation method").

Mixing of a carrier gas stream saturated with the vaporous component and a pure carrier gas stream.

Generation of a carrier gas stream saturated with the vaporous component and targeted condensing-out of excess vapour at a heat exchanger surface.

The metering of all the components in the gaseous state is bound up with considerable technical difficulties, since the mass flow measurement has to be carried out at raised temperature to avoid re-condensation. In the case of water as a vapour component, the temperature must for example be greater than 100° C. Many commercially available mass flow meters are thus ruled out, i.e. expensive special solutions for high media temperatures have to be selected.

The precision in the achievement of a target concentration of the vapour is limited in the method of direct evaporation by the metering accuracy of the liquid component. For example, the liquid mass flow is often so small that it cannot be metered with sufficient accuracy ("slow-flowing") and/or cannot be evaporated uniformly. A further drawback of direct evaporation is the relatively long rise and, in particular, fall times of the vapour concentration with a change in the metered liquid quantity between zero and a target value different from zero (typically in the region of several minutes).

The methods in which a carrier gas stream saturated with the vaporous component is first produced are disadvantageous in that a pure vapour atmosphere (vapour concentration 100%) and also a concentration close to 100% cannot be achieved on account of the required participation of carrier gas.

The methods of mixing a saturated and a vapour-free carrier gas stream are essentially limited to the use of water as a vaporous component, since it is only in this case that the measurement of the vapour concentration can be carried out in a particularly straightforward manner (e.g. by means of commercially available sensors for air humidity).

It is the problem of the present invention to overcome the aforementioned drawbacks of the prior art and to provide a method and a device for the generation of a continuous carrier gas/vapour mixture stream, by means of which the concentration of the vapour component can be adjusted in a wide range with little delay and high precision.

SUMMARY

This problem is solved according to the invention by a method and device for generating a continuous carrier gas/vapour mixture stream containing adjustable proportions of a carrier gas, in particular inert gas, and a vapour of a liquid, in particular water. The dependent claims relate to advantageous developments of the invention.

The basic idea of the invention consists in:
- using, in the case of a target concentration of the vapour component of zero, a "first metered carrier gas stream" provided specially for this purpose as the carrier gas/vapour mixture stream to be generated,
- using, in the case of a relatively low target concentration of the vapour component, a mixing method (mixing of a "second metered carrier gas stream" with a "metered saturated carrier gas/vapour mixture stream", and
- using, in the case of a relatively high target concentration of the vapour component, the direct evaporation method (using a "metered liquid stream", which is evaporated and mixed with the first gaseous mixture stream, in order to obtain a "second gaseous mixture stream").

The vaporous component or the liquid whose vapour is contained in the carrier gas/vapour mixture stream can in particular be water for example.

The term "relatively low" can in particular mean, for example, that the concentration, whilst being greater than zero, is nonetheless smaller then (alternatively: smaller than or equal to) a predefined, for example a fixed predefined, first threshold value.

The term "relatively high" can in particular mean, for example, that the concentration is equal to or greater than (alternatively: greater than) a second threshold value, which can for example be equal to the first threshold value. Alternatively, the second threshold value can be predefined greater than the first threshold value.

In an embodiment, use is made of a first threshold value which is predefined in a range from 10 to 50% and/or use is made of a second threshold value which is predefined in a range from 30 to 70%.

In the case of a vapour proportion that is to be adjusted relatively low in the carrier gas/vapour mixture stream, the "first gaseous mixture stream" is used as the carrier gas/vapour mixture stream, wherein in this operating mode the vapour proportion can be adjusted within broad limits, i.e. from almost zero up to a vapour proportion at which the carrier gas is saturated with the vapour. Such a variation of the vapour proportion can be brought about by corresponding variation of the metering of the saturated carrier gas/ vapour mixture stream and/or variation of the metering of the second metered carrier gas stream.

In contrast, in the case of a vapour proportion to be adjusted relatively high in the carrier gas/vapour mixture stream, the "second gaseous mixture stream" is used as the carrier gas/vapour mixture stream, wherein in this operating mode there are basically two possible ways of implementing a variation of the vapour proportion which can be used individually or combined with one another. On the one hand, there is the possibility of varying the composition of the first gaseous mixture stream as already explained. Moreover, there is the possibility of varying the metering of the liquid stream.

All the percentages given here for the target concentration of the vapour component are "molar vapour concentrations", i.e. ratios of the vapour quantity (substance quantity/particle number or standardised volume) to the total quantity (substance quantity/particle number or standardised volume) of the carrier gas/vapour mixture stream.

The flow rate (mass or volume per unit of time) of the carrier gas/vapour mixture stream generated by means of the invention can preferably be adjusted (by appropriate actuation of the metering) and in particular can be adjusted for example in a range which extends for example from zero to a maximum value, wherein this maximum value can lie for example in a range from 50 to 5000 ml/min.

In an embodiment, the carrier gas/vapour mixture stream is generated with a pressure of approx. 1 bar (approximately atmospheric pressure). In an embodiment, the carrier gas/vapour mixture stream is generated with an excess pressure. It is also conceivable for this pressure to be able to be adjusted in a predetermined range. A generation or adjustment of the pressure can also be implemented directly here, for example, by the fact that a specific throughput of the carrier gas/vapour mixture stream is directly generated or adjusted and the pressure then results corresponding to the flow resistance or pressure loss at the downstream components ("target system").

In an embodiment, provision is made such that the use of the first metered carrier gas stream, the first gaseous mixture stream and/or the second gaseous mixture stream as the carrier gas/vapour mixture stream is brought about by means of a valve arrangement, which is switched over for this purpose in such a way that the one of the streams currently to be used is provided at an operational outlet of the valve arrangement, whereas at least one of the streams not currently to be used is allowed to discharge at a waste gas outlet of the valve arrangement. As an alternative to allowing the discharge, e.g. into the atmosphere, provision can be made such that the "waste gas" is collected in order for it to be recycled, e.g. to recover the carrier gas therefrom (whether it is for reuse in the same device, or for other purposes).

Provision is made in an embodiment such that the provision of the metered saturated carrier gas/vapour mixture stream includes the following steps:
provision of a third metered carrier gas stream,
provision of a further metered liquid stream,
feeding of the third metered carrier gas stream and the further metered liquid stream to an evaporation/saturation device for evaporating the liquid and mixing with the third metered carrier gas stream. The term "evaporation" used here is for the most part to be understood in that any transition from the liquid into the gaseous state should be included thereunder, i.e. in particular also an "evaporation" at temperatures below the boiling temperature fixed by the absolute pressure.

The evaporation/saturation device can be implemented in a variety of ways, e.g. as a bubble column, a washer (e.g. "washing bottle") or fogger.

Each of the first, second and, if applicable, third metered carrier gas streams provided according to the invention can in particular be a metered inert gas stream (e.g. air, nitrogen, helium, argon etc., or for example mixtures of noble gases). A thermal flow controller (MFC), a Coriolis flow controller or a proportional valve can for example be used for the metering. "Inert" in the sense of the invention means first and foremost and quite generally that no reaction with the vapour takes place. An inert gas stream used according to the invention, however, can in particular also be "inert in the chemical understanding".

The mixing of the second metered carrier gas stream and the metered saturated carrier gas/vapour mixture stream can in the simplest case be carried out in a mixing chamber, to which the aforementioned streams are fed to a respective inlet and from which the resultant first gaseous mixture stream is carried away at an outlet.

The provision of the metered liquid stream as well as the further metered liquid stream also provided, if applicable, can be carried out in a variety of ways, e.g. using a thermal flow controller, a proportional valve, a syringe pump or a membrane pump. However, the metering requirement especially for the "further metered liquid stream" is small, inasmuch as with standard designs of the "evaporation/ saturation device" supplied therewith, it only has to be ensured that, for example, a filling level of the liquid in a saturator (e.g. washing bottle or suchlike) does not leave a provided working range. This can for example also take place discontinuously, e.g. by topping up liquid as required, e.g. when a lower threshold value of the filling level is fallen below. To this extent, for the further metered liquid stream, an actuated on/off valve in connection with a filling level measurement is in principle also sufficient for the "metering" in many cases.

The evaporation of the metered liquid stream and mixing with the first gaseous mixture stream can in the simplest case be carried out using a heated tube piece, which comprises connections for the supply and discharge of the corresponding streams. If an evaporation that is as uniform and pulsation-free as possible is desired, technically more complex solutions can also be used to this.

The liquid required for the provision of the metered liquid stream can be removed for example from a container for storing the liquid (and fed to a device for metering a liquid medium). The container can expediently be constituted pressure-resistant and diffusion-tight, in order to prevent undesired gaseous components from going into solution. By means of a downstream device for the liquid metering, the liquid can be supplied in a controlled mass flow to the evaporation/mixing device.

In a development of the invention, a moisture sensor is used to detect the actual vapour concentration of the first gaseous mixture stream, which has the advantage that, on the basis of the result of the detection, regulating action can be taken on the mass flows on the one hand of the second metered carrier gas stream and on the other hand of the metered saturated carrier gas/vapour mixture stream. Such a moisture sensor can be implemented in a variety of ways, e.g. as a moisture-sensitive plate condenser, a dew point mirror hygrometer or suchlike.

As an alternative or in addition to the mentioned moisture sensor for detecting the vapour concentration of the first gaseous mixture stream, one or more moisture sensors can be used for the detection of the vapour concentration of other streams provided within the scope of the invention. In particular, it is advantageous if the moisture sensor is used for detecting the actual vapour concentration of the generated carrier gas/vapour mixture stream. Sensor signals of this and/or other moisture sensors and/or flow meters can advantageously be used, in particular for controlling the vapour proportion in the generated carrier gas/vapour mixture stream.

Provision can be made with the device according to the invention such that the means for providing the first metered carrier gas stream and/or the means for providing the second metered carrier gas stream comprise.
- a carrier gas supply connection or a carrier gas reservoir,
- a controllable metering device for the gas metering.

The same applies to the means for providing the third metered carrier gas stream, provided if applicable.

In an embodiment, provision is made such that the means for providing the metered, vapour-saturated carrier gas/vapour mixture stream comprise:
- means for providing a third metered carrier gas stream,
- means for providing a further metered liquid stream,
- an evaporation/saturation device for evaporating the liquid of the further metered liquid stream and for mixing with the third metered carrier gas stream.

In an embodiment, provision is made such that the means for providing the metered liquid stream comprise:
- a liquid supply connection or a liquid reservoir,
- a controllable metering device for the liquid metering.

In an embodiment, provision is made such that the means for selecting the stream to be used as the carrier gas/vapour mixture stream is formed by a valve arrangement, which is designed able to be switched over in a controlled manner in such a way that the one of the streams currently to be used is provided at an operational outlet of the valve arrangement, whereas at least one of the streams not currently being used is allowed to discharge at a waste gas outlet of the valve arrangement.

In a development of this embodiment, the valve arrangement comprises a 4/2-way valve
- with a first valve connection for supplying the first metered carrier gas stream,
- with a second valve connection for supplying the second or third gaseous mixture stream,
- with a third valve connection, as an "operational connection", for providing the carrier gas/vapour mixture stream, and
- with a fourth valve connection, as a "waste gas connection", for allowing the discharge of streams not to be used wherein, in a first switching position of the valve, the first valve connection is connected to the third valve connection and the second valve connection is connected to the fourth valve connection,
- and wherein, in a second switching position of the valve, the first valve connection is connected to the fourth valve connection and the second valve connection is connected to the third valve connection.

In the invention, use is preferably made of a, for example, central control device (e.g. microcontroller) to actuate the devices used for the gas and liquid metering and the device (e.g. 4/2-way valve) used for selecting the relevant stream as the carrier gas/vapour mixture stream according to a predefined target concentration of the vaporous component.

During the actuation of a least one, in particular a plurality or all of the actuated metering devices, a control can in particular be implemented in that corresponding sensor devices are used to measure the relevant actual mass flows, the sensor signals whereof are fed to the aforementioned control device for implementing corresponding control loops.

According to an embodiment, the control device is designed to store a "concentration program" that can be inputted by a user (a time-dependent course of the desired proportions of carrier gas and vapour, i.e. a desired target concentration of the vapour component) and then to process said concentration program automatically by means of corresponding actuation of the actuatable devices.

BRIEF DESCRIPTION OF THE DRAWINGS

The invention is described in further detail below on the basis of an example of embodiment making reference to the appended drawings. In the figures.

DETAILED DESCRIPTION

Figure 1:
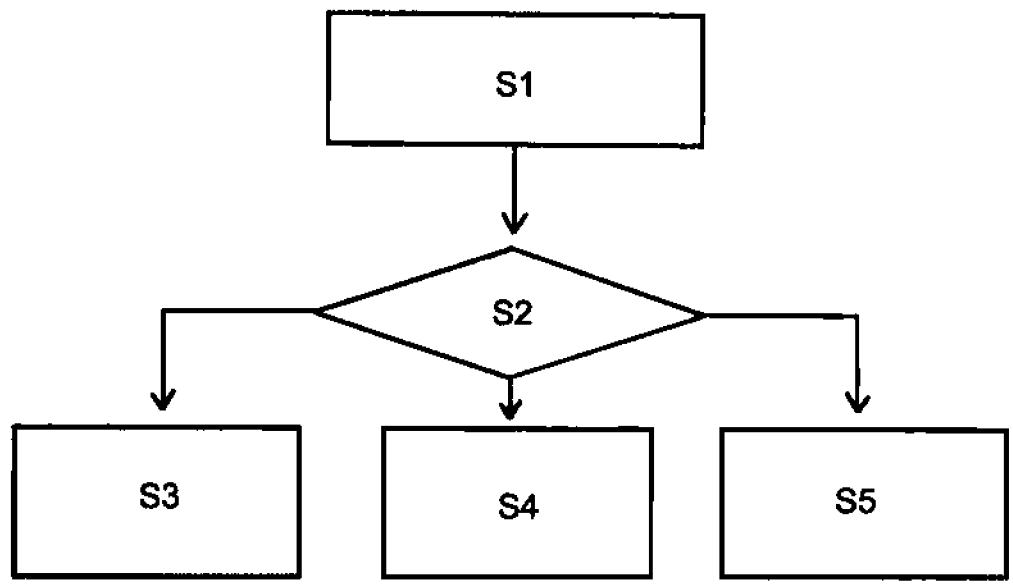
FIG. 1 shows a flow chart of the method according to the invention for generating a continuous carrier gas/vapour mixture stream according to the example of embodiment.

FIG. 1 illustrates essential steps of a method for generating a continuous carrier gas/vapour mixture stream.

In a step S1, a definition of a target concentration of the vaporous component (proportion of the vapour in the carrier gas/vapour mixture stream) takes place, whether it be for example by a direct input by a user or as part of an automatic processing of a "concentration program", which establishes a time-dependent course of this target concentration (previously inputted by a user). A definition of a total flow rate (e.g. mass per unit of time or volume per unit of time) of the carrier gas/vapour mixture stream is preferably also enabled in step S1, or equivalently a definition of the mass flow rates of the carrier gas proportion and the vapour proportion. The latter magnitudes directed towards the flow rates can also be predefined for example by the aforementioned concentration program.

In a step S2, an assessment of the currently predefined target concentration takes place to establish whether the latter is zero, or is relatively low or is relatively high.

The term "relatively low" can for example mean that the concentration, whilst being greater than zero, is nonetheless less than a fixed predefined threshold value, and the term "relatively high" can for example mean here that the concentration is greater than this threshold value.

If, in step S2, it is judged that the vapour proportion should be adjusted to zero, the processing proceeds to a step S3, in which a first metered carrier gas stream is used as the carrier gas/vapour mixture stream to be generated.

If, in step S2, it is judged that the vapour proportion to be adjusted is relatively low, the processing proceeds to a step S4, in which a first gaseous mixture stream is instead used, which is generated by mixing a second metered carrier gas stream with a provided metered, vapour-saturated carrier gas/vapour mixture stream.

If, in step S2, it is judged that the vapour proportion to be adjusted is relatively high, the processing proceeds to a step S5, in which a second gaseous mixture stream is used, which is generated by providing a metered liquid stream, feeding the same to an evaporation/mixing device for the evaporation of the liquid and mixing with the first gaseous mixture stream.

The processing then proceeds back to step S1.

In the performance of steps S4 and S5, the respective relevant meterings are each adjusted, moreover, as a function of the target concentration defined in step S1 (and, if applicable, as a function of a time-related trend in this target concentration or a target concentration to the adjusted in the future).

In the performance of step S4, it is the metering of the second metered carrier gas stream and the metering of the vapour-saturated carrier gas/vapour mixture stream.

In the performance of step S5, the same aforementioned meterings (as in step S4) are adjusted, but in addition also the metering of the liquid stream, which is evaporated and mixed with the first gaseous mixture stream.

Figure 2:
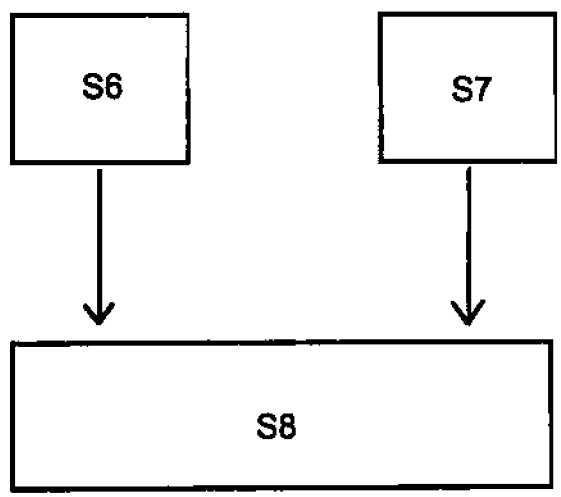
FIG. 2 shows a flow chart of a method by means of which the saturated carrier gas/vapour mixture stream is provided in the example of embodiment.

FIG. 2 illustrates the method of providing the metered saturated carrier gas/vapour mixture stream that is used in the described example of embodiment.

For this purpose, a third metered carrier gas stream is provided in step S6 and a further metered liquid stream is provided in step S7.

In a step S8, the third metered carrier gas stream and the further metered liquid stream are fed to an evaporation/saturation device, in order to evaporate the liquid and mix the latter with the third metered carrier gas stream.

Figure 3:
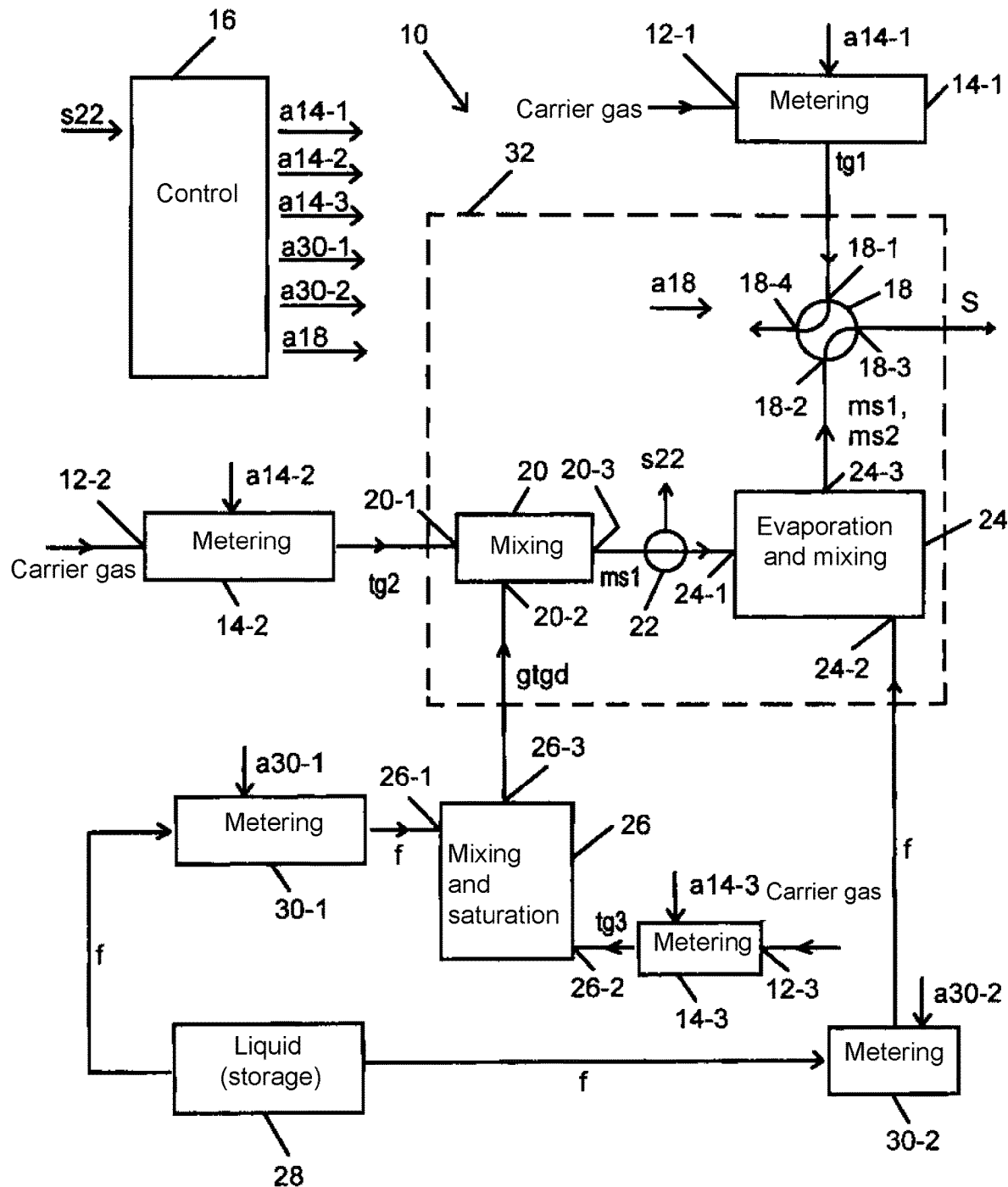
FIG. 3 shows a block diagram of a device for performing the method according to the invention according to the example of embodiment.

FIG. 3 shows a device 10 provided according to the described example of embodiment for generating a continuous carrier gas/vapour mixture stream S.

Device 10 comprises gas inlets 12-1, 12-2 and 12-3 for the supply of carrier gas (here for example helium). The carrier gas is provided for example from a storage bottle used jointly for gas inlets 12-1 to 12-3.

Gas inlets 12-1 to 12-3 convey the carrier gas, as represented, to an assigned, controllable gas metering device 14-1, 14-2 and respectively 14-3, in order to provide a first metered carrier gas stream tg1, a second metered carrier gas stream tg2 and a third metered carrier gas stream tg3. Device 10 also comprises a central control device (here: microcontroller) 16, which amongst other things actuates gas metering devices 14-1 to 14-3 to obtain a mass flow of each of carrier gas streams tg1, tg2 and tg3 each defined as part of a running control program. The control signals emitted for this by control device 16 are denoted in FIG. 3 by a14-1, a14-2 and a14-3.

If it is specified according to the control program that a vapour proportion in carrier gas/vapour mixture stream S to be generated is to be adjusted to zero, a 4/2-way valve is actuated by means of control device 16 according to a "first operating mode", in such a way that a first connection 18-1, to which first metered carrier gas tg1 is fed, is connected to a third connection 18-3 of valve 18, at which desired carrier gas/vapour mixture stream S is provided (in this case, however, with a vapour proportion of zero).

If, however, control device 16 establishes that a vapour concentration is to be adjusted that is greater than zero and less than or equal to 20%, control device 16 actuates 4/2-way valve 18 according to a "second operating mode", in such a way that second connection 18-2 of valve 18 is connected to third connection 18-3 of valve 18 (as represented in FIG. 3).

In this operating mode, a "first gaseous mixture stream" ms1 arrives at third connection 18-3 of valve 18 serving as an operational connection, said first gaseous mixture stream being provided at an outlet 20-3 of a mixing device 20, whereby second metered carrier gas stream tg2 fed to a first inlet 20-1 is mixed with a metered, vapour-saturated carrier gas/vapour mixture stream gtgd fed to a second inlet 20-2.

By means of suitable metering on the one hand of second metered carrier gas stream tg2 and on the other hand of saturated carrier gas/vapour mixture stream gtgd, both the total flow rate of first gaseous mixture stream ms1 and the concentration of the vapour proportion contained therein can be adjusted in the desired manner.

In the example of embodiment represented, stream ms1 is conveyed via a moisture sensor 22 for the measurement of the actual current vapour concentration, so that control device 16 can carry out a regulation of the vapour concentration in stream ms1 on the basis of a sensor signal s22 fed to it by moisture sensor 22.

Downstream of moisture sensor 22, stream ms1 is conveyed via an evaporation/mixing device 24 to second connection 18-2 of valve 18, which device however is virtually inactive in the present operating mode (relatively low vapour proportion to be adjusted) or at least with a very low vapour proportion to be adjusted. Stream ms1 fed to inlet 24-1 is again discharged at outlet 24-3 without further modification.

The provision of metered saturated carrier gas/vapour mixture stream gtgd takes place in the represented example of embodiment at an outlet 26-3 of an evaporation/saturation device 26 for the (in the represented example, thermally driven) evaporation of a metered liquid f supplied at an inlet 26-1 and mixing of the latter with third metered carrier gas stream tg3 supplied at an inlet 26-2.

Liquid f originates in the represented example from a container 28 serving as a liquid reservoir, from which liquid f is fed via a first liquid metering device 30-1 to first inlet 26-1 of evaporation/saturation device 26.

Proceeding from container 28, liquid f is fed moreover via a second liquid metering device 30-2 to a second inlet 24-2 of evaporation/mixing device 24, which enables a "third operating mode" of device 10, which is selected in the case of a relatively high vapour proportion to be adjusted in the carrier gas/vapour mixture stream (e.g. greater than 20%) and which is characterised in that control device 16 actuates valve 18, as in the second operating mode, for the connection of second valve connection 18-2 to third valve connection 18-3, but moreover also actuates second liquid metering device 30-2 for a suitably metered supply of liquid f to second inlet 24-2.

For the third operating mode, it is important that a metered addition of liquid takes place by means of liquid metering device 30-2, wherein a variation of this liquid metering can take place in order to vary the ultimately desired vapour proportion. As an alternative or in addition to a variation of the liquid metering, a desired variation of the ultimately obtained vapour proportion at least over a certain range can also take place in the third operating mode by varying the meterings at metering devices 14-2 and/or 14-3.

The regions of device 10 in which a flow of vapour-containing streams (streams ms1, ms2, gtgd) is provided should be heated to prevent condensing-out of vapour. In the described example, therefore, region 32 shown with a broken line in FIG. 3 is heated (e.g. to at least 100° C. in the case of water vapour).

To sum up, described device 10 permits the generation of a continuous carrier gas/vapour mixture stream at connection 18-3 of 4/2-way valve 18 acting as an "operational connection", wherein the target concentration of the vapour contained therein (e.g. water vapour) can be adjusted variably, without great delay and with precision over a broad range (e.g. 0 to 100%).

A "concentration program" is preferably stored in control device 16, which has previously been inputted or defined by a user and which is subsequently processed by control device 16. During the processing of such a program, the various metering devices are preferably operated continuously taking account of the total flow rate and vapour concentration currently desired and desired "in the near future".

In particular, this means that, for example in the case of a target concentration of the vapour currently lying at zero (first operating mode), which however in the course of time is to increase (second operating mode), all the device components required for providing first gaseous mixture stream ms1 are already operating, even before the vapour concentration is actually intended to be greater than zero. Stream ms1, as long as not yet required, is fed via valve 18 to "waste gas connection" 18-4, until stream ms1 is actually required and valve 18 is therefore correspondingly switched over.

If, proceeding from the second operating mode, a further increase in the target concentration leading into the third operating mode takes place, a metering differing from zero begins by means of metering device 30-2. If, during the third operating mode, a still further increase in the target concentration is to take place, a continuous increase in the liquid quantity metered by metering device 30-2 with a simultaneous reduction in the metering of saturated stream gtgd is, for example, advantageously provided for this by means of device 16.

Conversely, if for example, proceeding from the third operating mode, a reduction in the target concentration ultimately leading into the second operating mode is to take place, actuation can for example take place by means device 16 such that the metering of saturated stream gtgd is already increased before the liquid quantity metered by metering device 30-2 is reduced to zero (the reduction of the liquid quantity to zero indicates the transition from the third into the second operating mode).

Figure 4:
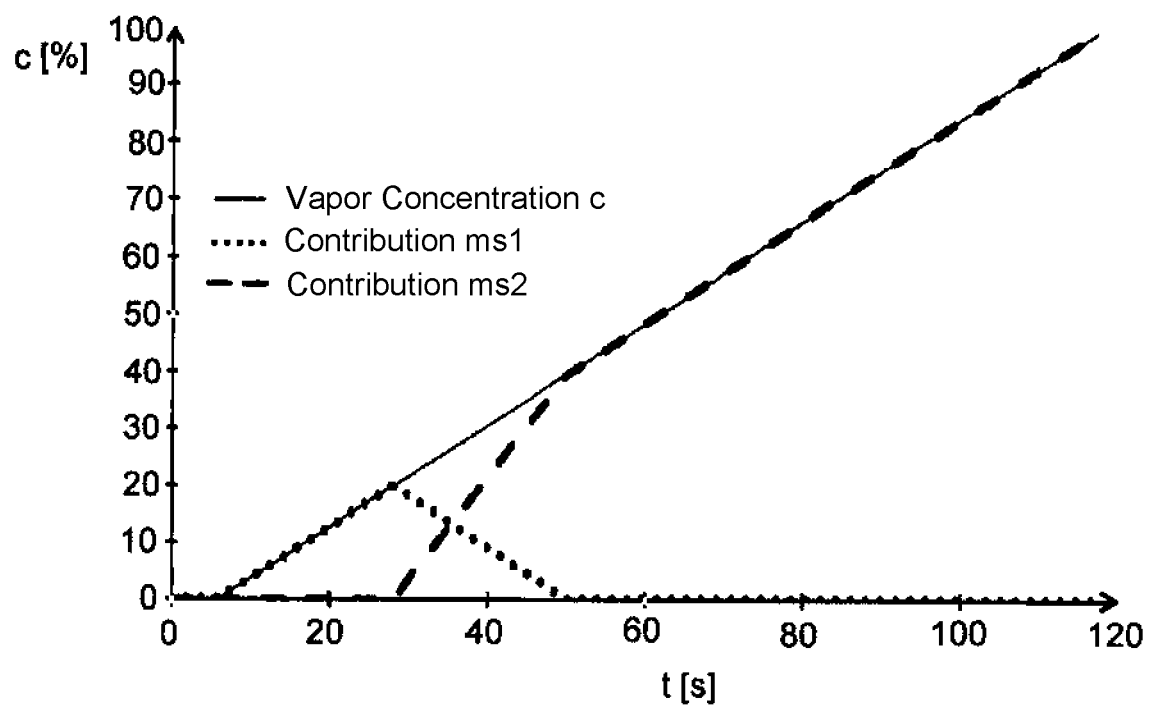
FIG. 4 shows an exemplary time-course diagram to illustrate a temporal variation of a target concentration of the vaporous component and the contributions thereby made on the one hand by the first gaseous mixture stream and on the other hand by the second gaseous mixture stream.

FIG. 4 shows an example of a concentration program processable with device 10, i.e. a target concentration c of the vapour component in the carrier gas/vapour mixture stream as a function of time t.

In the represented example, a target concentration of c=0 is to be adjusted in a time range from 0 to 7 s, whereas target concentration c is to increase linearly to 100% in the subsequent time range from 7 to 117 s.

Correspondingly, device 10 operates up to a time t=7 s in the first operating mode, wherein first metered carrier gas stream tg1 is used as the carrier gas/vapour mixture stream.

From time t=7 s, valve 18 is switched over, so that first gaseous mixture stream ms1 is used, wherein the vapour proportion is brought about exclusively by the corresponding generation of stream ms1 by corresponding activation of metering devices 14-2, 14-3 and 30-1 up to a time t=29 s (here, corresponding to a target concentration c=20%). At time t=29 s, the transition from the second operating mode into the third operating mode takes place.

In a time period lasting up to time t=50 s during the third operating mode (corresponding to a concentration c=40%), the contribution made by stream ms1 falls and the contribution made by stream ms2 (or the liquid stream produced by metering device 30-2) rises to desired target concentration c.

From time t=50 s, device 10 operates in the third operating mode, wherein however metering devices 14-3 and 30-1 are inactive.

In the subsequent time course of the program, the adjustment of further increasing target concentration c takes place by a corresponding increase in liquid f added by metering device 30-2 and, if applicable, simultaneous reduction of carrier gas stream tg2, if the total throughput is to be kept constant.

In the described device 10, 4/2-way valve 18 serves either to supply the mixture with the predetermined adjusted target concentration of the vapour component provided by stream ms1 or (in the case of an addition of the liquid by means of metering device 30-2) stream ms2 or to supply the pure carrier gas (stream tg1) to a target system connected to valve connection 18-3. A rapid change between vapour-containing and vapour-free atmosphere for the target system can thus be advantageously achieved. It is particularly advantageous with the described embodiment that the target concentration can already be adjusted, i.e. a suitable mixing ratio of the involved mass flows can be established, before the target system is acted on by the mixture by a means of a corresponding valve switch-over. Thus, compared to a change of the mixture ratios, an adjusting control or regulating time is considerably shortened for changing the predetermined target concentration from zero to a value different from zero. Furthermore, the diffusion of vapour molecules from the region of evaporation/saturation device 26 or evaporation/mixing device 24 is reliably eliminated by means of switch-over valve 18, without the gas stream to the target system being interrupted. The target system can thus be swept with reliably vapour-free carrier gas, until the valve position is duly changed.

With regard to heated region 32 of device 10, the latter in an advantageous embodiment is provided in the form of a solid block heated in a controlled manner, in which the components concerned and the lines connecting the latter are either directly integrated or are at least connected to the block in a manner providing good thermal conduction.

What is claimed is:

1. A method for generating a continuous carrier gas/vapour mixture stream containing adjustable proportions of a carrier gas and a vapour of a liquid, comprising the steps:
in the case of a vapour proportion to be adjusted to zero in the carrier gas/vapour mixture stream, provision of a first metered carrier gas stream and use thereof as the carrier gas/vapour mixture stream,
in the case of a relatively low vapour proportion to be adjusted in the carrier gas/vapour mixture stream:
provision of a second metered carrier gas stream,
provision of a metered, vapour-saturated carrier gas/vapour mixture stream,
mixing of the second metered carrier gas stream with the metered, vapour-saturated carrier gas/vapour mixture stream to provide a first gaseous mixture stream, and use of the first gaseous mixture stream as the carrier gas/vapour mixture stream,
in the case of a relatively high vapour proportion to be adjusted in the carrier gas/vapour mixture stream, provision of a metered liquid stream and feeding thereof to an evaporation/mixing device for evaporating the liquid and mixing with the first gaseous mixture stream to provide a second gaseous mixture stream, and use of the second gaseous mixture stream as the carrier gas/vapour mixture stream.

2. The method according to claim 1, wherein the use of the first metered carrier gas stream, the first gaseous mixture stream, and/or the second gaseous mixture stream as the carrier gas/vapour mixture stream is brought about by a valve arrangement, which is controlled in such a way that one of the streams currently to be used is provided at an operational outlet of the valve arrangement, whereas at least one of the streams not currently to be used is allowed to discharge at a waste gas outlet of the valve arrangement.

3. The method according to claim 1, wherein the provision of the metered, vapour-saturated carrier gas/vapour mixture stream comprises the following steps:

provision of a third metered carrier gas stream, provision of a further metered liquid stream, and feeding the further metered liquid stream to an evaporation/saturation device for evaporating the liquid and mixing with the third metered carrier gas stream.

4. The method according to claim 1, wherein the carrier gas comprises an inert gas.

5. The method according to claim 1, wherein the liquid comprises water.

* * * * *